United States Patent

[11] 3,623,100

[72] Inventor Bruce E. Rapp
 Garden Grove, Calif.
[21] Appl. No. 821,033
[22] Filed May 1, 1969
[45] Patented Nov. 23, 1971
[73] Assignee Northrop Corporation
 Beverly Hills, Calif.

[54] LANE COUNTER FOR DIGITAL NAVIGATIONAL COMPUTER SYSTEM
 15 Claims, 14 Drawing Figs.

[52] U.S. Cl..................................................... 343/103,
 343/105
[51] Int. Cl..................................................... G01s 1/24
[50] Field of Search........................................... 343/103,
 105

[56] References Cited
 UNITED STATES PATENTS
 3,422,433 1/1969 De Vaul .................. 343/103

*Primary Examiner*—Rodney D. Bennett, Jr.
*Assistant Examiner*—R. Kinberg
*Attorney*—Sokolski & Wohlgemuth ABSTRACT: Computing circuitry for a monitoring system to computationally detect the occurrence of a transition which is derived from a time relationship of received input signals. Aperture computing circuitry selectively measures sampled aperture signals produced from the received input signals and circuit storage circuitry categorizes the sampled aperture signal in accordance with its measured time duration by computing a lane or zone status which is stored therein. The zone status data is further processed by a comparator circuit which computationally detects the occurrence of a monitored transition.

INVENTOR
BRUCE E. RAPP

BY Sokolski & Wohlgemuth
ATTORNEYS

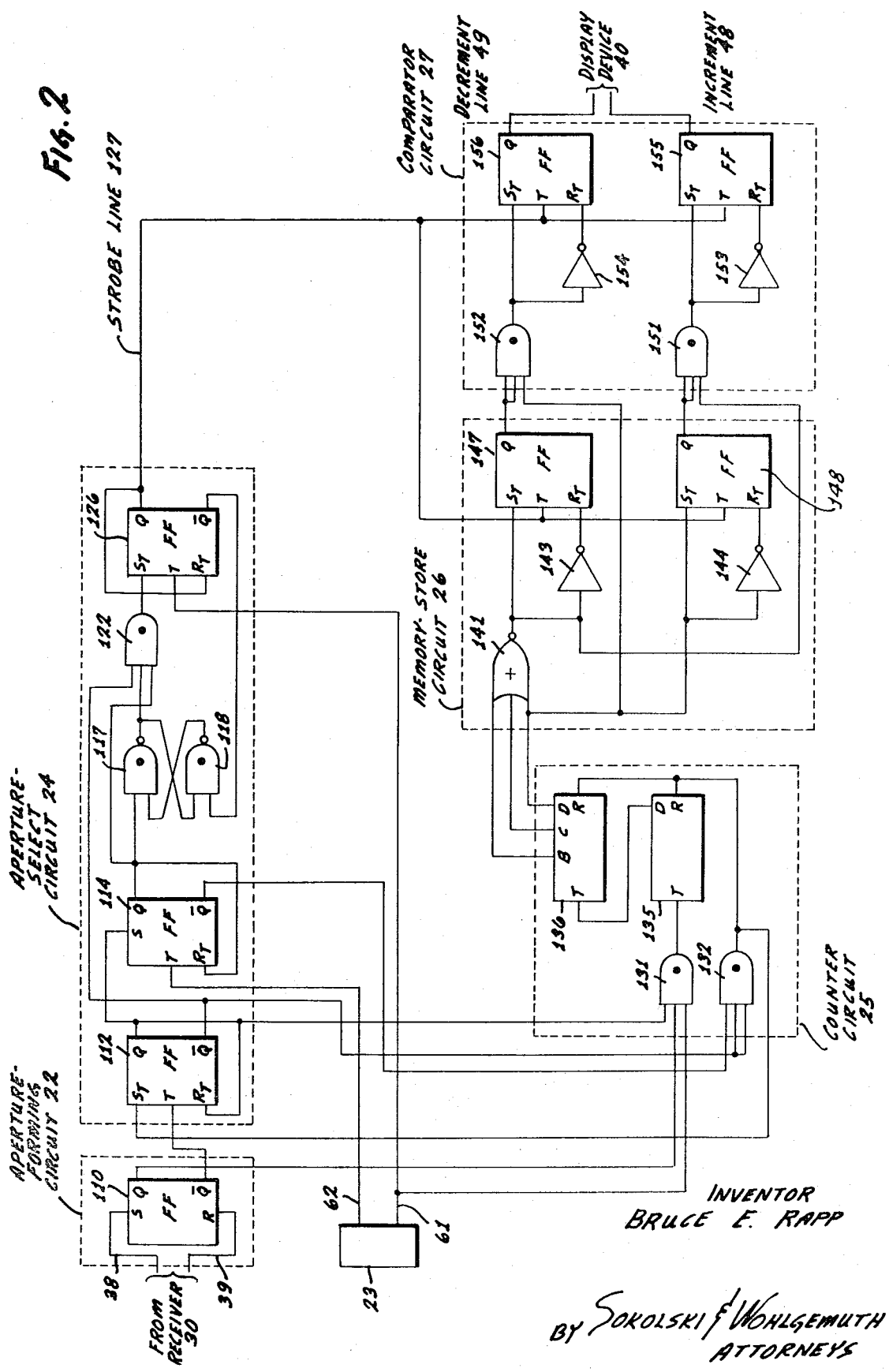

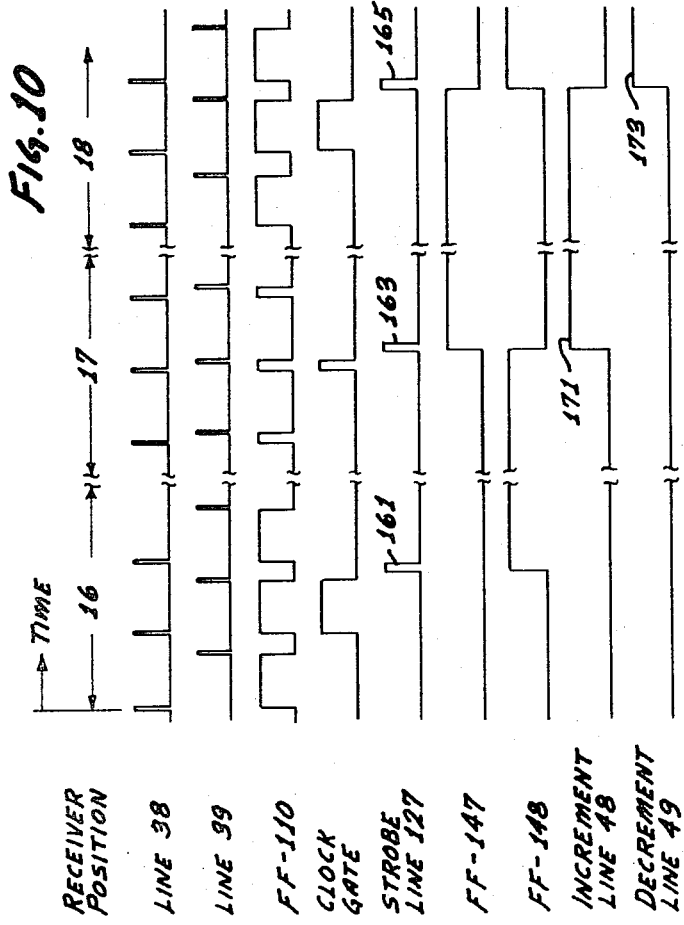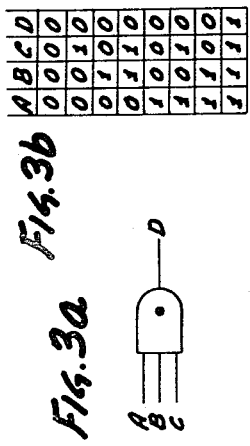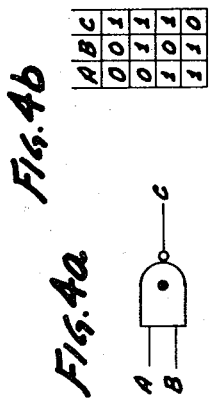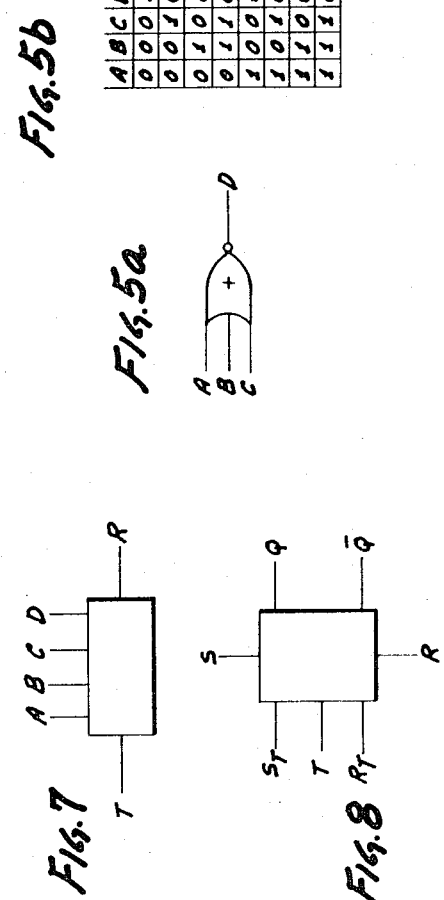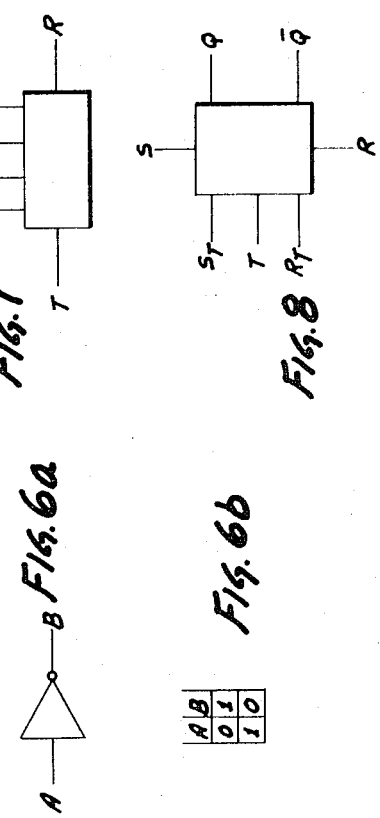
INVENTOR
BRUCE E. RAPP
BY SOKOLSKI & WOHLGEMUTH
ATTORNEYS

LANE COUNTER FOR DIGITAL NAVIGATIONAL COMPUTER SYSTEM

This invention relates to digital computing circuitry and more particularly to transition computing circuitry used in a navigation system to monitor the position of a vehicle moving through predetermined lane boundaries established by transmitted navigation signals.

The prompt and safe passage of vehicles through relatively desolate areas are facilitated by continually improving global navigation systems which enable a moving vehicle to be continuously and accurately aware of its geographic position. A typical global navigation system, such as the Omega Navigation System, includes pairs of spaced transmitters located in fixed positions and broadcasting low-frequency signals produced in a known time relationship. The low-frequency signals from each transmitter are monitored by receivers in moving vehicles for use by the computing circuitry of their navigation computation equipment to determine the vehicle's position. The phase relationship of the two low-frequency signals received at the moving vehicle depends upon the relative distance of the vehicle to each of the transmitting stations. The locii of points along which the two low-frequency signals are in-phase are termed lane boundaries and are hyperbolic lines separated by lanes of an approximate average width of 8 miles. A moving vehicle, starting in a known lane, has a computer for computing its position by noting the number of lane boundaries it has passed through and thereby ascertains the lane of its present position. Its location along the lane is determined by repeating the described procedure with a second pair of transmitters producing boundary lanes disposed at an angle to those established by the first pair of transmitters, thereby serving to define a coordinate system by which the position of the moving vehicle is ascertained.

The low-frequency signals from paired transmitters received on a moving vehicle are in-phase whenever the vehicle is on the lane boundary and the phase difference between the signals increase in proportion to the vehicle's distance from one boundary lane to a second one. The moving vehicle's computer recognizes a lane boundary crossing when it senses the in-phase relationship of the received signals. However, when the vehicle crosses a boundary line at an acute angle or travels close to a boundary line and nearly parallel to it, a boundary crossing may be erroneously sensed as a result of inherent limitations of the system such as signal distortions, noise, etc., and consequently the position of the vehicle would be erroneously computed. For example, intermittent in-phase signals sensed by a vehicle moving close to a lane boundary and nearly parallel to it could erroneously indicate that more than one lane boundary had been crossed and that the vehicle was positioned in an adjacent lane.

Accordingly, the present invention provides for positively detecting a vehicle's passage through a lane boundary and storing this fact in such a way that the integrity of the storage sum of such events is maintained throughout any random maneuvering of the vehicle with respect to the transition lanes. In the described logic circuitry, this is achieved by periodically computing the vehicles position in one of two lanes or zones separated by a lane boundary. A signal in accordance with each computed zone position is stored and compared with that stored from a prior computation. The successive computation of two selected zone positions occurring in a predetermined sequence positively indicates that the vehicle has crossed a lane boundary and additionally indicates the direction of the vehicle's movement across the boundary lane.

Other objects and features of the invention will become apparent to those skilled in the art as the disclosure is made in the following detailed description of a preferred embodiment of the present invention as illustrated in the accompanying sheets of drawings, in which:

FIG. 2 is a schematic diagram which more particularly illustrates the circuitry of the navigation computing logic shown in FIG. 1;

FIGS. 3a, 4a, 5a, 6a, 7 and 8 are schematic representations of an AND gate, NAND gate, NOR gate, inverter, decade counter and flip-flop, respectively, as they are used in the description of the present invention;

Figure 1:
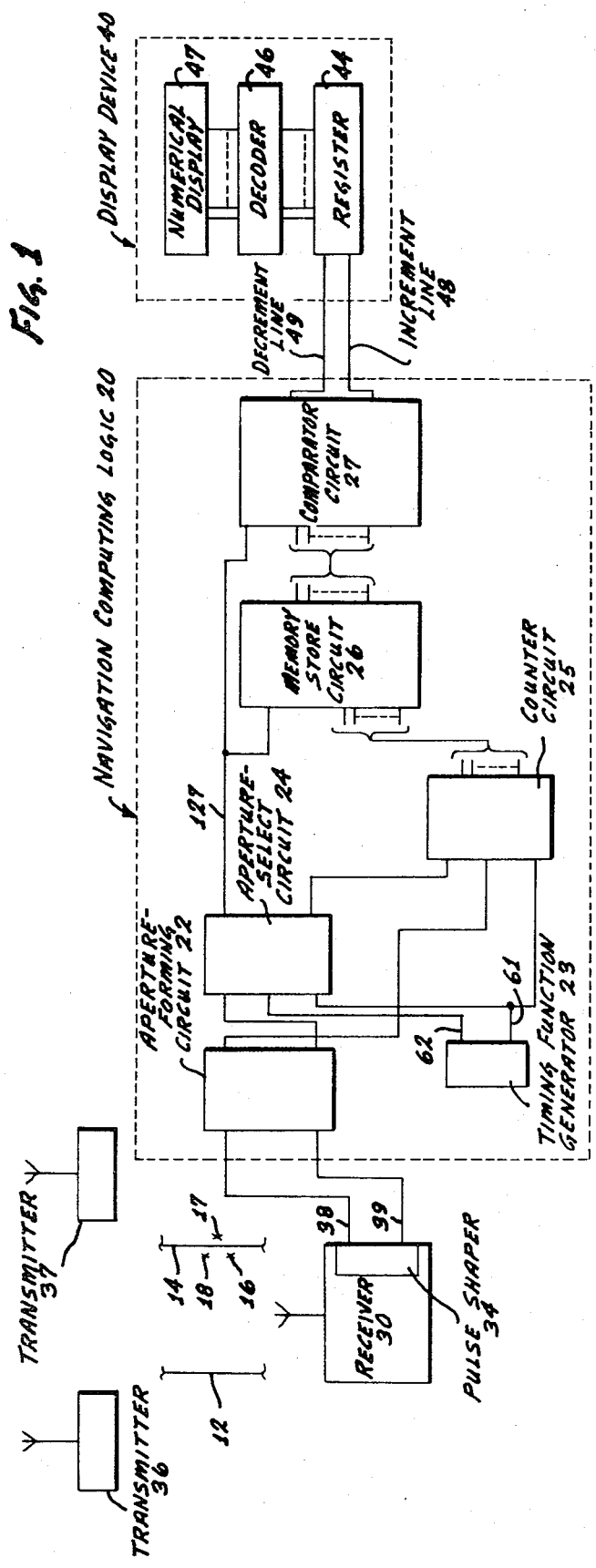
FIG. 1 is a schematic, partially pictorial, block diagram of the navigation system including a receiver on a vehicle moving across a lane boundary established by a pair of spaced transmitters.
Figure 9:
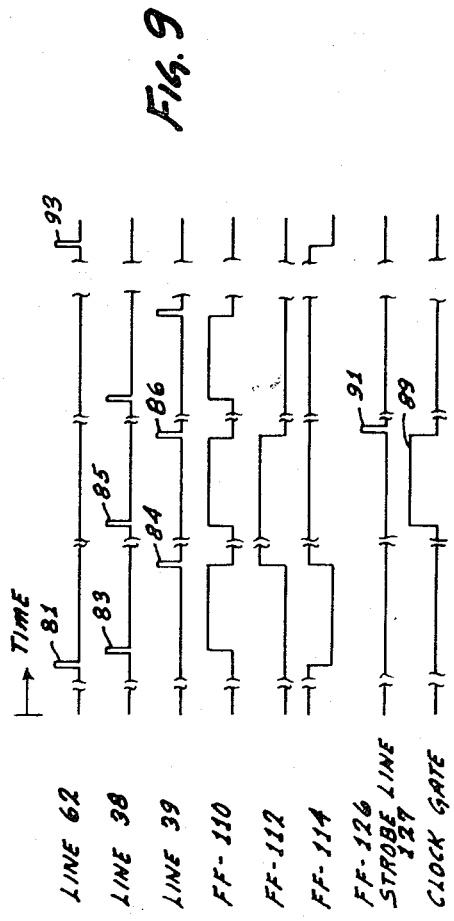

FIGS. 3b, 4b, 5b, and 6b are truth tables for the respective AND gate of FIG. 3a, NAND gate of FIG. 4a, NOR gate of FIG. 5a and inverter of FIG. 6a;

FIG. 9 is a timing diagram useful in describing the signals developed in the aperture-forming circuit and the aperture-select circuit of FIG. 2; and FIG. 10 is a timing diagram illustrating the sequence of signals developed in the logic circuitry of FIG. 2 as the receiver crosses the lane boundary shown in FIG. 1.

In order to provide a clear understanding of the present invention, a preferred embodiment thereof will be considered from a number of viewpoints and in an order which will best reveal its novel features and advantages. First, an overall view of a navigation system, including two spaced transmitters and a receiver with connecting computing logic on board a moving vehicle, will be presented which will point out the manner in which the position of a moving vehicle is computed in a navigation system including the computing logic of this invention. Next, detailed logic circuit descriptions will be provided to illustrate preferred logical circuitry for the navigation system and to point out the advantageous organization of the computing logic. Finally, the basic system hardware will be considered with particular reference to a timing diagram which illustrates the sequence of signals developed by the zone category computations occurring as a moving vehicle crosses a boundary lane.

The overall view of a navigation system which embodies the described navigation computing equipment is shown schematically in FIG. 1. A receiver 30 is in a vehicle moving about lane boundaries 12 and 14 with marked geographic positions 16, 17 and 18 located closely adjacent to lane boundary 14 as shown. Navigation computing logic 20 connects between the receiver 30 and a display device 40. The navigation computing logic 20 includes an aperture-forming circuit 22 connected to the receiver 30, to an aperture-select circuit 24 and to a counter circuit 25. A memory-store circuit 26 receives signals from both the aperture-select circuit 24 and the counter circuit 25 and the memory-store circuit 26 outputs signals to a comparator circuit 27 which connects in turn to the display device 40. A timing function generator 23 connects to both the aperture-select circuit 24 and the counter circuit 25. The display device 40 includes a register 44 and a decoder 46 which formats the numerical count contained in register 44 for input to a numerical display device 47 providing a visual presentation of the contents of register 44.

The receiver 30 receives low-frequency periodic signals, i.e., 10,200 hertz, broadcast from fixed transmitters 36 and 37 spaced apart from each other. The receiver 30 includes a converter for developing an intermediate frequency of 102 hertz and a pulse shaper 34 which produces discrete pulses on lines 38 and 39 corresponding in time to the phase relationship of the low-frequency signals received from transmitters 36 and 37, respectively. The signal pulses from the receiver 30 on lines 38 and 39 are appropriately shaped with short rise and fall times for use with the digital circuitry in the navigation computing logic 20. In response to the signals on lines 38 and 39, an aperture-forming circuit 22 generates successive aperture signals to the aperture-select circuit 24 and the counter circuit 25. The aperture signals are present for the time duration following a pulse on line 38 to the succeeding pulse on line 39 which is the same time duration as the phase displacement between the low-frequency signals received from transmitters 36 and 37. The timing function generator 23 periodically outputs an interval sampling signal on line 62 to the aperture-select circuit 24 which signal is used to provide for the periodic selection of aperture signals. The selected aperture signal enables the counter circuit 25 to count high-frequency clock signals received from the timing function generator 23 on line 61 during the presence of the selected signal from the aperture-forming circuit 22. Following the selected aperture signal, the counter circuit 25 contains a count of the high-frequency clock pulses occurring between the pulses on lines 38 and 39, in that order, which count is a numerical indication of the phase displacement of the signals received from fixed transmitters 36 and 37. It should now be understood that the clock signals are of a sufficiently high frequency to attain a desired resolution for the numerical indication of phase displacement consistent with the accuracies of the navigation system.

The count contained in the counter circuit 25 is gated by a strobe signal on line 127 from the aperture-select circuit 24 to associate the count with a zone position on one or the other side of a lane boundary, which information may be stored in the memory store circuitry 26. A zone status signal representing the computed zone position, this signal indicating whether the receiver is in a zone or lane on one or the other side of a lane boundry, in addition to a second zone status signal representing a prior computed and stored zone position, is transferred from the memory store circuit 26 to the comparator circuit 27 which is also enabled by the strobe signal on line 127 to produce a signal on increment signal line 48 or decrement signal line 49 in accordance with its computation when the moving vehicle has crossed a lane boundary. The particular line 48 or 49 is selected by the comparator circuit 27 to correspond to the computationally detected direction of crossing of the lane boundary. A signal appearing on line 48 or 49 serves to increment or decrement, respectively, the register 44 containing a summary count of the lane boundaries crossed by the moving vehicle. This binary-coded summary count in register 44 is converted by decoder 46 to an appropriate format for the numerical display 47, which thereby provides a continuously updated display of the summary count. It is understood that register 44 may easily be connected to additional circuitry for further automatic processing of the computed data contained therein.

Reference will next be made to FIG. 2 showing a more detailed schematic block diagram of the navigation computing logic 20 with input signal lines 38 and 39 from the receiver 30 and output signal lines 48 and 49 to the display device 40. Before describing the circuit of FIG. 2, the characteristics of the logic modules included therein will first be reviewed in detail in order to facilitate an understanding of the invention by later presenting a description of the circuit shown in FIG. 2 based upon a prior understanding of the logic modules included therein. An AND gate represented in FIG. 3a is a multiple input logic element whose output is at a high level or true (binary 1) only when all of its inputs are at a high level or true. A truth table for the AND gate of FIG. 3a is shown in FIG. 3b. A NAND gate, which is represented in FIG. 4a, is a multiple input logic element whose output is at a low level or false (binary 0) only when all of its inputs are at a high level or (binary 1) as indicated in the truth table of FIG. 4b. A NOR gate, FIG. 5a, is a multiple input logic element whose output is at a high level or true (binary 1) only when all of its inputs are at a low level or false (binary 0). At all other times the output of the NOR-gate is false (binary 0) as indicated in the truth table of FIG. 5b. An inverter, FIG. 6a, is a single input, single output logic element whose output is, as the name implies, the inverse of its input. More explicitly, if the input to an inverter is a binary 1, the output will be a binary 0, while if the input is a binary 0, the output will be a binary 1. The truth table for an inverter is illustrated in FIG. 6b. A decade counter shown in FIG. 7 counts pulses received on input terminal T, each new input pulse successively advancing the count from 0 to 9 on output lines A, B, C and D which have respective weights of 1, 2, 4 and 8, and then cycling to zero. A pulse to the input terminal R resets the decade counter setting all the output terminals to a binary 9. Of course, not all the outputs of the decade counter need be utilized and the decade counters shown in FIG. 2 are based upon the symbol shown in FIG. 7 with only the appropriate terminals illustrated.

A flip-flop, FIG. 8, is a bistable device whose output is a function of its last input. The flip-flop shown is a five-input device including two pairs of set and reset terminals. Considering first the paired set and reset input terminals, S and R, respectively, a binary 1 supplied to the set terminal S places the flip-flop into its set state in which condition there is a binary 1 (a high level) at its Q output terminal and a binary 0 (a low level) at its $\overline{Q}$ output terminal. Conversely, a binary 1 supplied to the reset terminal R places the flip-flop into its reset state in which case there is a binary 0 at its Q output terminal and a binary 1 at its $\overline{Q}$ output terminal. The second paired set and reset terminals, $S_T$ and $R_t$, respectively, differs only from that of the previously described first set by the inclusion of a signal at a third input terminal T. The operation of the flip-flop with respect to paired input $S_T$ and $R_T$ is essentially identical to that of the flip-flop with respect to paired inputs S and R except that there must be a binary 1 at the T input terminal concurrent with a binary 1 at either set or reset terminals $S_T$ or $R_T$ in order for the flip-flop to change its state. More specifically, the flip-flop has the property of responding to a binary 1 input to terminal T and changing its state in accordance with the signals applied to input terminals $S_T$ or $R_T$ only when there is a low-to-high transition, i.e., binary 0 to binary 1 transition, of the signal on input terminal T. Of course, not all the inputs of this flip-flop need be utilized and the flip-flops shown in FIG. 2 are based upon the symbol shown in FIG. 8 with only the appropriate terminals labeled.

Referring again to the detailed schematic block diagram shown in FIG. 2, the navigation computing logic 20 will now be described in greater detail. The aperture-forming circuit 22 is comprised of a flip-flop (FF) 110 with input lines 38 and 39 from the receiver 30 connecting to the set (S) and reset (R) inputs respectively of FF–110. The Q-output terminal of FF–110 connects to the counter circuit 25 and the signal from the Q-output terminal is true for the time period following a signal pulse on line 38 and preceding a subsequent pulse on line 39. The $\overline{Q}$-output terminal connects to the aperture-select signal 24 and, as previously described, the signal from the $\overline{Q}$-output terminal is the logical inverse of that from the Q-output terminal. The various timing intervals for the enabling of logic circuitry and the establishment of marker pulses for the counting circuitry are provided by the timing function generator 23. A continuous train of evenly spaced output pulses at a frequency high enough to enable accurate time measurement, 10.2k being presently preferred, is provided on clock line 61 to the counter circuit 25 and the aperture-select circuit 24. In addition, a second continuous train of evenly spaced output signals at a frequency low enough to enable periodic sampling, 30 Hz. presently preferred, is provided on sampling line 62 to the aperture-select circuit 24.

The aperture-select circuit 24 is seen to be comprised of flip-flops (FF) 112, 114 and 126, NAND-gates 117 and 118 and an AND-gate 122. A signal from the counter circuit 25 to the $S_T$ input terminal of FF–112 causes that flip-flop to be set by a rising signal from the $\overline{Q}$-output of FF–110 to the T input of FF–112 when FF–110 is reset. The Q-output of FF–112 connects to its $R_T$ input enabling the flip-flop to be reset by a subsequent rising signal from the $\overline{Q}$-output of FF–110 when that flip-flop is next reset. The Q-output terminal of FF–112 also connects to the S input terminal of FF–114 thereby setting FF–114 when FF–112 is set. FF–114 is reset by a periodic sampling signal on line 62 from the timing function generator 23 to the T-input of FF–114. NAND-gates 117 and 118 are interconnected to form a bistable latch with a setting input from the Q-output terminal of FF–114, a resetting input from the $\overline{Q}$-output terminal of FF–126 and a single output to AND-gate 122. When FF–114 is set, the setting signal from its Q-output terminal sets the bistable latch circuit producing a binary 1 output signal to AND-gate 122. A binary 1 signal from AND-gate 122 to the $S_T$ input terminal of FF–126 causes that flip-flop to be set by a first subsequent high-frequency marker pulse on line 61 from the timing generator 23 to the T-input terminal of FF-126. When FF-126 is set, the connection from its Q-output terminal to its $R_T$ input enables FF-126 to be reset by a subsequent high-frequency marker pulse to its T-input terminal from the timing generator 23. When FF-126 is reset, the signal from its $\overline{Q}$-output terminal resets the bistable latch circuit formed by gates 117 and 118 producing a binary 0 output to AND-gate 122.

The aperture-forming circuit 22 and the aperture-select circuit 24 shown in FIG. 2 will now be described with reference to the timing diagram of FIG. 9 which illustrates the time relationship of the signals developed in this circuitry. FF-114 is initially reset by an interval pulse 81 from the timing function generator 23 on line 62. An input signal pulse 83 on line 38 follows the interval pulse 81 to set FF-110 which is then reset by a subsequent input pulse 84 on line 39 from the receiver 30. The resetting of FF-110 causes FF-112 to be set which, in turn, sets FF-114 as shown. The setting flip-flop 114 causes the bistable latch formed of NAND-gates 117 and 118 to be set. Subsequent input signal pulses 85 and 86 on lines 38 and 39, respectively, again sets and resets FF-110 so that FF-110 remains set for the time duration between the two input pulses 85 and 86. A clock gating signal 89, which will also be described with reference to the counter circuit 26, denotes the time interval that flip-flops 110 and 112 are set, which is the same time interval between input signal pulses 85 and 86 from the receiver 30. The gating signal 89 is terminated by the input pulse 86 resetting FF-110 which, in turn, resets FF-114. With FF-112 reset, FF-114 set and the bistable latch (gates 117 and 118) set, a true signal is transferred through AND-gate 122 enabling FF-126 to be set by a high-frequency clock pulse on line 61. The setting of FF-126 with its Q-output terminal connected to its $R_T$ input terminal thereby enables FF-126 to be reset by a subsequent clock pulse on line 61 which produces a strobe pulse 91 on strobe line 127 following the clock gating signal 89. The resetting of FF-126 with its $\overline{Q}$-output terminal connected to the input of gate 118 resets the bistable latch formed of gates 117 and 118. The described circuit operation is repeated during each sampling period commenced by an interval pulse, e.g., interval pulse 93 on line 62 which resets FF-114. It should be understood that the interval pulses on line 62 can occur in a random time relationship to the signal pulses on lines 38 and 39 and, for example, pulse 81 can follow pulse 83 and precede pulse 84. In this event, the described circuitry still operates so that the clock gage signal pulse 89 coincides with a complete aperture gate and occurs between pulses 85 and 86 as shown. However, it should be noted that FF-112 is not set unless FF-114 is in a reset state and that once FF-114 is set by the rising signal from FF-112, FF-114 stays set until the next interval pulse on line 62, e.g., pulse 93.

Still referring to FIG. 2, the counter circuit 25 includes decade counters 135, 136 which are reset by a signal transferred through an AND-gate 132 and the counter 135 is sequentially advanced by clock signals transferred through an AND-gate 131. More specifically, a resetting signal from AND-gate 132 to decade counter 135 and FF-112 is produced when flip-flops (FF) 112 and 114 are in a reset state. The high-frequency clock pulses on lines 61 from the timing generator 23 are gated through AND-gate 131 to advance counter 135 when flip-flops (FF) 110 and 112 are in a set state, which time duration is schematically shown as clock gating signal 89 in FIG. 9. Each clock pulse transferred through gate 131 increments the decade counter 135. An output of counter 135 is connected to decade counter 136 so that counter 136 is incremented once for every 10 clock pulses gated to counter 135. It should be understood that the frequency of the clock pulses from the timing function generator 23 and the number of decade counters and their interconnection in the counter circuitry 23 are coordinated so that when a maximum number of clock pulses are gated through gate 131, the highest order decade counter, i.e., counter 136, achieves a maximum count without cycling to zero.

The memory-store circuit 26 is seen to include a NOR-gate 141 connected to selected outputs of decade counter 136 so that the output of gate 141 is true when decade counter 136 contains a count of less than two based on a maximum possible count of nine. Set inputs $S_T$ of flip-flops 147 and 148 are respectively connected to the output of gate 141 and counter 136 at terminal D, the latter has a true signal thereon when the counter attains a count of eight or more. A strobe pulse on strobe line 127 sets flip-flop 147 or 148 should either flip-flop have a true signal at its $S_T$ input terminal. The $S_T$ input to flip-flops 147 and 148 are also connected to the input of AND-gates 151 and 152, respectively. In addition, the Q-output terminal of flip-flops 147 and 148 are connected to the input of gates 152 and 151, respectively, so that when FF-148 is set and the output of NOR-gate 141 is true, the output of AND-gate 151 is true. Conversely, when the output of FF-147 is true and the signal to the $S_T$ input of FF-148 is true, the output of AND-gate 152 is true. A true output signal from either gate 151 or 152 enables a corresponding flip-flop 155 or 156 to be set by the strobe pulse on strobe line 127. Inverters 143, 144, 153, 154 are connected between the $S_T$ and $R_T$ inputs of flip-flops 147, 148, 155 and 156, respectively, so that flip-flops not having a true signal at their $S_T$ input terminals are reset by the strobe pulse on line 127. In this manner, the status of flip-flops 147 and 148 are a categorization of the count attained in the counter circuit 25 during a selected aperture signal from aperture-forming circuit 22 and the status of flip-flops 155 and 156 reflect the respective computations made to detect the vehicle's transition across a lane boundary.

The operation of the circuit shown in FIG. 2 will now be described with reference to the timing diagram of FIG. 10 as the receiver 30 is moved across the lane boundary 14 of FIG. 1 from position 16 to position 17 and then to position 18. The input signal pulses from the receiver 30 on lines 38 and 39 produce aperture signals from FF-110 which are of the same time duration as the spaced interval between the input signals. It should be noted that with the receiver close to one side on lane boundary 14, for example positions 16 and 18, the time duration following a signal on line 38 to a signal on line 39 is much larger than when the receiver is close to the other side of lane boundary 14 in position 17. Furthermore, with the receiver 30 in positions 16 and 18, the duration of the clock gate, which corresponds to the duration following the signal on line 38 to the signal on line 39, is sufficiently long for the decade counter 136 to achieve a count of eight or greater. On the other hand, with the receiver 30 at position 17, the time duration of the clock gate is such that the decade counter 136 achieves a count of less than two. Considering first the receiver in position 16 causing the high count in decade counter 136, the strobe pulse 161 causes flip-flop 148 to set, leaving flip-flops 147, 155 and 156 reset. Before the next sampling of input signals, the receiver 30 is moved across boundary line 14 to position 17 where the narrow clock gate produces a count of less than 2 in the decade counter 136. A true signal is thereby gated through NOR-gate 141 to FF-147 and to AND-gate 151, which signal is then gated through AND-gate 151 by the set flip-flop 148 to the $S_T$ input of FF-155. A strobe signal pulse 163 then causes flip-flops 147 and 155 to be set producing an increment signal 171 on increment line 48 to the display device 40. And the strobe pulse 163 also resets FF-148. Referring momentarily to FIG. 1, it should be understood that register 44 in the display device 40 is incremented by the rising edge of a signal on line 48 and register 44 is decremented by the rising edge of a signal on line 49. Moving the receiver 30 across lane boundary 14 to position 18 before the next sampling of input signals, the long clock gate enables the decade counter 136 to achieve a count of eight or more, thereby presenting a high signal level to FF-148 and gate 152. This signal level is gated through AND-gate 152 by the set flip-flop 147 to FF-156. A strobe signal pulse 165 then causes flip-flops 148 and 156 to be set producing a decrement signal 173 on decrement line 49 and the strobe pulse also resets flip-flops 147 and 155.

I claim:

1. In apparatus for navigational aid systems of the kind wherein positional information for a vehicle moving relative to geographic lanes fixed by predetermined lane boundaries is derived from a time relationship between first and second recurring signals transmitted at a predetermined repetition rate and received from a respective first and second transmitter, including:
   receiving means for receiving the first and the second recurring signals transmitted from the corresponding first and second transmitter;
   aperture computing means coupled to said receiver means for periodically generating a signal indicative of phase displacement between the first and second recurring signals received by said receiving means;
   storage circuit means for generating and storing a signal in accordance with the phase displacement between said signals whenever said phase displacement is within one of two predetermined ranges, one of said ranges representing a vehicle position in a zone on one side of a lane boundary, the other of said ranges representing a vehicle position in a zone on the other side of said lane boundary, and
   comparator circuit means for comparing the stored signal and a succeeding signal in accordance with phase displacement and generating a signal whenever said compared signals represent phase displacements within different ones of said predetermined ranges, said last mentioned generated signal indicating the transition of the vehicle across a lane boundary.

2. The invention in accordance with claim 1, wherein said aperture-computing means includes
   an aperture-forming circuit for generating successive aperture signals present for the same time duration as the phase displacement between the first and second recurring signals received from the corresponding first and second transmitter, and
   an aperture-select circuit coupled to said aperture-forming circuit for periodically selecting one of a plurality of successively occurring aperture signals to be measured by said aperture-computing means.

3. The invention in accordance with claim 2, wherein said aperture-select circuit includes circuitry to synchronize the storing of said signal in said circuit storage means and the generation of a signal by said comparator circuit means in accordance with the duration of the selected aperture signal.

4. The invention in accordance with claim 2, wherein said aperture-computing means includes
   a counter means coupled to said aperture-select circuit for measuring the time duration of the selected aperture signal generated by said aperture-forming circuit.

5. The invention in accordance with claim 4, including
   a time-pulse generator providing high-frequency clock signals to said counter means, and
   said counter means include counter circuitry to count the clock signals occurring during an aperture signal selected by said aperture-select circuit, the counter circuitry adapted to attain a count corresponding in value to the time duration of the selected aperture signal.

6. The invention in accordance with claim 1, wherein
   said comparator circuit means includes means to compute the vehicle's direction of transition across a lane boundary and to generate an increment signal or a decrement signal corresponding to the computed direction of transition.

7. The invention in accordance with claim 6, further including
   display register means coupled to said comparator circuit means and responsive to the generated increment and decrement signals to provide a summary count of the lane boundary transitions made by the vehicle.

8. In apparatus for monitoring systems of the kind wherein information as to the occurrence of a transition in either a first or second opposing direction is derived from a time relationship between first and second recurring signals received by the apparatus, including:
   an aperture-forming circuit means for generating successive aperture signals present for time durations following each of said first recurring signals and terminated by each of said second recurring signals;
   counter means coupled to said aperture-forming circuit means for measuring the time interval of an aperture signal;
   an aperture-select circuit means coupled to said aperture-forming circuit means and to said counter means for periodically selecting one of a plurality of successively occurring aperture signals to be measured by said counter means;
   circuit storage means responsive to the time interval measurement made by said counter means for storing a signal in accordance with zone status in memory storage for further processing; and
   comparator circuit means for computationally detecting a monitored transition by comparing the zone status signal retained in said circuit storage means with a signal in accordance with the time interval of a succeeding aperture signal.

9. The invention in accordance with claim 8, wherein
   said aperture-select circuit means includes circuitry to synchronize the storing of the zone status signal in said circuit storage means and the comparing of the zone signal by said comparator circuit means in accordance with the duration of the selected aperture signal.

10. The invention in accordance with claim 8, wherein
    said comparator circuit means includes means to compute the direction of transition and to generate a first or a second signal corresponding to a computed first or second opposing direction of transition.

11. The invention in accordance with claim 10, including
    register means coupled to said comparator circuit means and responsive to the first and second signals corresponding to the computed first and second opposing directions of transition to provide a summary count of the transitions.

12. The invention in accordance with claim 8, including
    a time pulse generator providing high-frequency clock signals to said counter means, and
    said counter means including counter circuitry to count the clock signals occurring during an aperture signal selected by said aperture-select circuit means, the counter circuitry adapted to attain a count corresponding in value to the time interval of the selected aperture signal.

13. In apparatus for navigational aid systems of the kind wherein positional information for a vehicle moving relative to geographic lanes fixed by predetermined lane boundaries is derived from a time relationship between first and second recurring signals transmitted at a predetermined repetition rate and received from a respective first and second transmitter, including:
    an aperture-forming circuit means for generating successive aperture signals present for a time duration corresponding to the phase displacement between the first and second recurring signals received from the respective first and second transmitters;
    counter means coupled to said aperture-forming circuit for measuring the time duration of an aperture signal;
    circuit storage means responsive to the time duration measurement made by said counter means for retaining a signal in accordance with zone status in memory storage for further processing; and
    comparator circuit means for computationally detecting the vehicle's transition across a lane boundary by comparing the zone status signal retained in said circuit storage means with a signal in accordance with the time duration of a succeeding aperture signal.

14. The invention in accordance with claim 13, including
    an aperture-select circuit coupled to said aperture-forming circuit means for periodically selecting one of a plurality of successively occurring aperture signals to be measured by said counter means 15. The invention in accordance with claim 15, including a counter means coupled to said aperture-select circuit, and a time-pulse generator providing clock signals to said counter means which includes circuitry to count the clock signals occurring during an aperture signal selected by said aperture-select circuit, the counter circuitry adapted to attain a count corresponding in value to the time duration of the selected aperture signal.

* * * * *